United States Patent [19]

Frisk

[11] 4,333,560
[45] Jun. 8, 1982

[54] APPARATUS FOR REMOVING PARTICULATE MATERIAL FROM A PILE THEREOF

[75] Inventor: Olof E. Frisk, Järved, Sweden

[73] Assignee: Mo och Domsjo Aktiebolag, Ornskoldsvik, Sweden

[21] Appl. No.: 174,384

[22] Filed: Aug. 1, 1980

[51] Int. Cl.³ ............................................. B65G 65/02
[52] U.S. Cl. .................................... 198/519; 414/133
[58] Field of Search ............... 198/511, 517, 519, 521, 198/506, 508; 414/133

[56] References Cited

U.S. PATENT DOCUMENTS 1,829,923  11/1931  Cole ..................................... 198/519

Primary Examiner—Robert B. Reeves
Assistant Examiner—Douglas D. Watts

[57] ABSTRACT

Apparatus is provided for removing particulate material not normally larger than about 0.5 dm³ in volume such as wood chips, bark, coal, ore, slag, municipal waste or industrial waste, from a pile whose sides are at an angle of at least 40° to the horizontal. The apparatus includes an elongated scraper means arranged for oscillating movement along its longitudinal axis in contact with the sides of the pile from the bottom to the top of the pile for scraping material down from the pile towards approximately ground level where the material is carried by conveying means away from the pile site. The scraper means is carried on a frame arranged for movement along the base of the pile of material and at right angles thereto to selected parts of said pile for scraping material from the pile.

9 Claims, 4 Drawing Figures

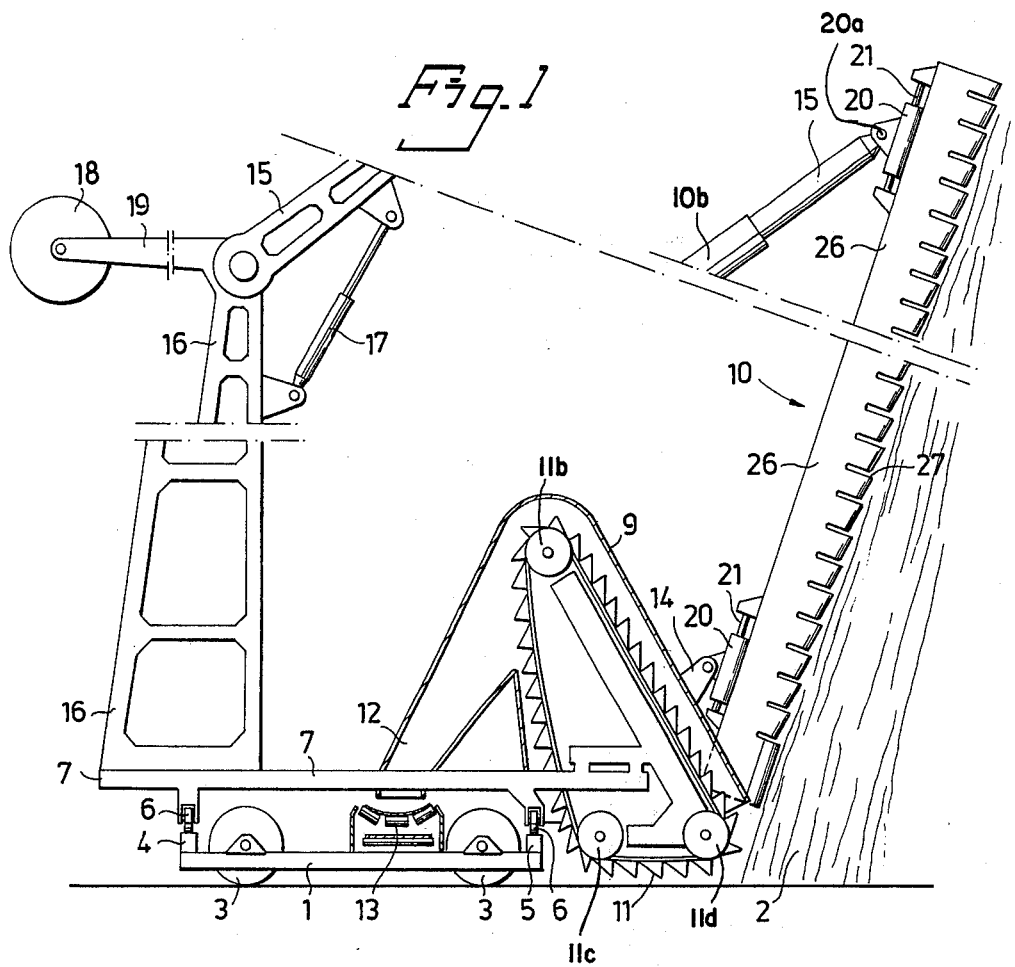
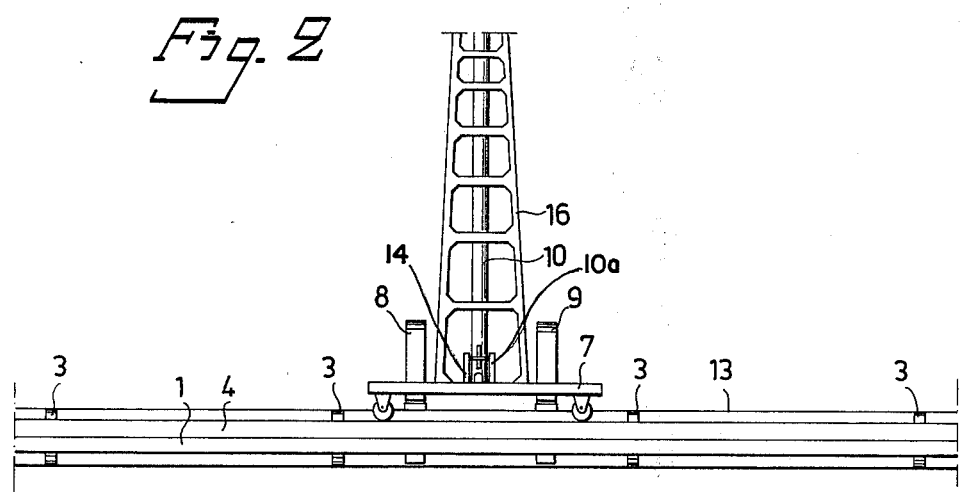

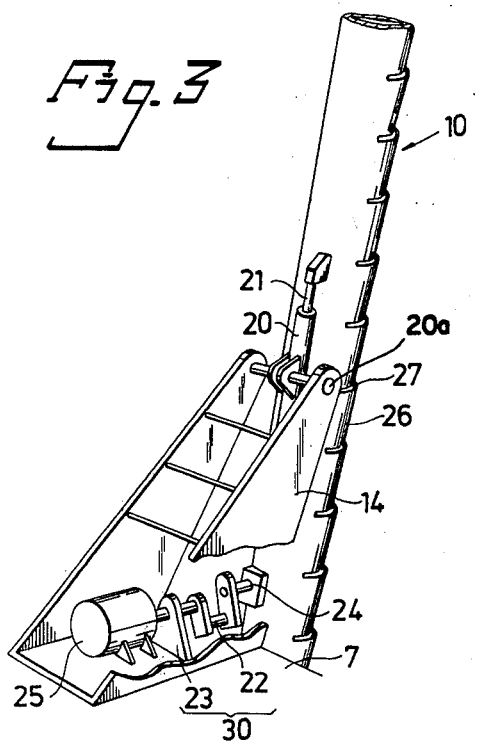
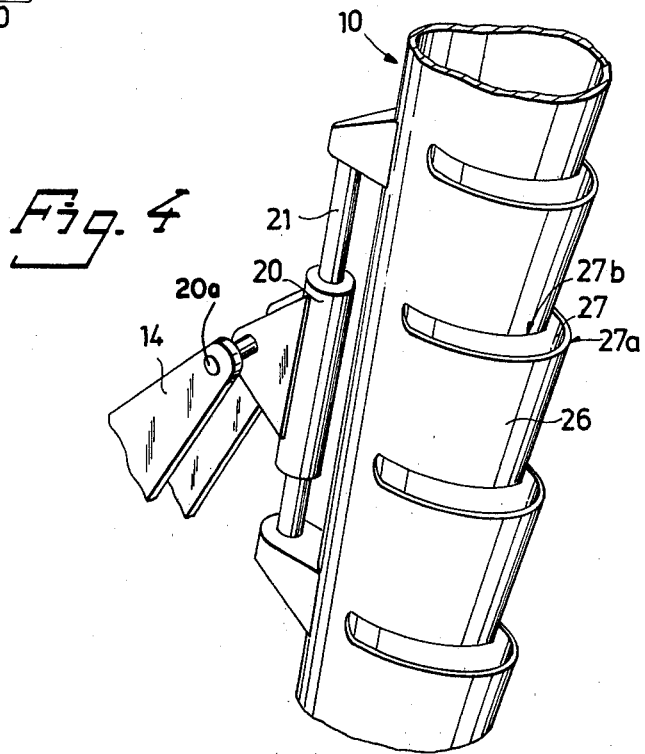

APPARATUS FOR REMOVING PARTICULATE MATERIAL FROM A PILE THEREOF

Apparatus for removing particulate material from a pile normally comprises scraper means in the form of an elongated beam arranged for oscillatory movement in its longitudinal direction and provided with a plurality of transversely extending rakes arranged close together. When the scraper means is brought against the pile material, and caused to oscillate, the rakes tear material loose from the pile. This material falls down onto the ground where it is collected by, for example, a bucket or a scoop, and transported away from the pile site by a conventional conveyor. Such apparatus is illustrated, for example, in German Offenlegungsschrifts Nos. 2,504,975, 2,461,756 and 2,305,106, and in U.S. Pat. No. 3,108,700.

The scraper means can also take the form of a screw, which is arranged for rotation longitudinally of the scraper means, and is oriented downwardly, or in the form of two parallel mutually co-acting screws which are brought into engagement with the side of the pile and which, when rotating, continuously scrape material off the pile and carry it down to the ground.

The design and construction of the scraper means of such apparatus have a number of serious disadvantages. Scraper means provided with oscillating rakes, the most common design, scrape the material down from the pile over an excessively large area of the ground. Consequently, a significant part of the material scraped from the pile tends to land outside the normal working area of the bucket, scoops or other collecting means. Such material must be gathered up with a tractor, or manually, and formed in separate piles within reach of the material-collecting means, which is not only time consuming but also increases operating costs due to the need for the tractor and/or labour.

Scraper means provided with rotatable screws means also tend to spread the material scraped from the pile over an excessively wide area of the ground. In addition, screws have a much lower efficiency in the removal of bulk material from piles thereof than oscillating rakes.

The aforementioned disadvantages are eliminated by the apparatus of the present invention for removing particulate material from a pile thereof, comprising, in combination, an elongated tubular scraper means arranged for oscillatory movement along its longitudinal axis; and a base structure mounted on the ground upon which the scraper means is carried in a manner to be brought into contact with the side of the pile of material from the bottom up to the top of the pile, and which when oscillating scrapes material from the pile down to the ground, so that said material can be collected and carried away from said pile, the scraper tube being open at the bottom thereof, movable, and having a side wall which can be brought into contact with a side of the pile, and is provided with a plurality of slots arranged one above the other and extending along the longitudinal axis of said tube, the lower edge of at least one such slot projecting outwardly from the outer wall of the tube further than the upper edge of such slot.

In the apparatus of the invention, particulate material is scraped from the pile into the oscillating tube through the slots therein, and falls freely down through the tube whence it is fed out through the open bottom towards the ground. The tube directs the material scraped from the pile into a small area on the ground, well within reach of the material-collecting apparatus, thereby obviating the need for gathering material into individual piles by means of a tractor or by other means.

A preferred embodiment of apparatus according to the invention is illustrated in the drawings, in which:

FIG. 1 illustrates a side view of the apparatus for removing wood chips from an outdoor pile thereof, looking along the base of a pile of material;

FIG. 2 illustrates an end view of the apparatus of FIG. 1, looking towards the pile.

FIG. 3 is a perspective view of a drive means for oscillating the scraper means of the apparatus of FIGS. 1 and 2; and FIG. 4 is a detail view of the tubular scraper means of the apparatus of FIGS. 1 and 2 showing the slot-openings and support element structure.

The apparatus shown in the Figures is movable on wheels towards and away from the pile. An elongated undercarriage 1 carries and supports the apparatus, and is provided with wheels 3 on which the undercarriage rolls towards and away from the pile 2. The undercarriage is moved by means of a motor (not shown). Mounted on the undercarriage 1 are two rails 4, 5, which extend along the longitudinal axis of the undercarriage, and on which a carriage 7 moves on wheels 6. The carriage 7 carries two bucket elevator scoops 8,9 and a tubular scraper means 10 of the invention is mounted between the elevator scoops. The bucket elevator scoops are of conventional design, having a plurality of scoops 11 fixed to an endless belt 11a running over guide and drive wheels 11b, 11c, 11d. The scoops can be moved over the ground adjacent the base of the pile. The scoops include an outlet pipe 12 discharging the material collected by the scoops over a belt conveyor 13 on the undercarriage 1.

The scraper tube 10 is rotatably mounted at its lower end 10a on a bracket structure 14 which is fixedly mounted on the carriage 7, at an angle that is inclined towards the pile. The upper end 10b of the scraper tube 10 is rotatably arranged in the end of a telescopically, loosely extendable and withdrawable jib 15. The jib is rotatably mounted on a relatively high frame structure 16 that is attached to the carriage 7, so that the scraper tube 10 can be moved to different angles of inclination to the pile. For the purpose of rotating the jib 15, there is provided a hydraulic piston-cylinder arrangement 17, which is pivotally mounted between the jib 15 and the frame structure 16. A beam 19 provided with a counterweight 18 extends outwardly from the frame structure 16 in an opposite direction.

The scraper tube is arranged for oscillatory movement along its longitudinal axis, said movement being effected by means of a drive arrangement 30 (see FIG. 3). The scraper tube 10 is connected to the bracket structure 14 and the jib 15 by way of a sleeve 20 pivotably mounted via pivot pin 20a to the bracket structure and said jib. The sleeve 20 is reciprocably displaceable along a shaft 21 extending in parallel with the scraper tube 10 and fixedly mounted thereon. The bracket structure 14 and the jib 15 are mounted on the opposite wall of the scraper tube for rotating the scraper tube.

The drive arrangement 30 comprises a crank 22 rotatably mounted on a bearing block 23 on the carriage 7 (see FIG. 3). The crank is pivotally coupled at its free end to a ball coupling 24 mounted on the scraper tube. In this way, the rotary movements of the crank are transmitted to the scraper means through the ball coupling, imparting an oscillatory movement to the scraper tube 10, guided along the longitudinal axis thereof by the sleeve 20 and the shaft 21. The crank 22 is driven by a motor 25. The drive arrangement and the motor are axially displaceable.

In accordance with the invention, the scraper tube 10 extends downwardly and is open at the bottom. The wall 26 of the tube 10 facing the pile 2 of material has a plurality of slots 27 (see FIG. 4) in alignment and extending transversely along the longitudinal axis of the tube. The width of the slots 27 in the longitudinal axis of the tube is about 30 cm, which is far greater than the size of the separate wood chips, while the length or span of the slots is approximately two-thirds of the circumference of the tube. Each slot is formed with a lower edge 27a that projects outwardly further from the wall of the tube in the central part of the slot than at the ends of the slot. In this way, wood chips can be readily scraped into the tube through the slots, when the scraper means moves upwards while being oscillated, along the side of a pile. In the illustrated embodiment, the slots are formed in a manner such that the lower edge 27a of each slot projects further from the tube than the corresponding upper edge 27b by a maximum of about 10 cm. The aforementioned slot measurements are not critical, and the size of the slots can be varied in manufacture according to the nature and size of the particulate material in the pile.

In operation, the undercarriage 1 is moved towards the side of the pile of wood chips, so that the slotted side wall of the scraper tube 10 contacts the side of the pile. At the same time, the carriage 7 is moved on the undercarriage 1, so that the chips are removed uniformly over the whole height of the pile 2 along the base thereof. When necessary, the angle of inclination of the scraper tube is adjusted by means of the hydraulic piston-cylinder arrangement 17.

As a result of the oscillatory movement of the scraper tube, created by the rotating crank 22, wood chips are scraped down through the slots into the tube 10, the wood chips falling down through the tube and being discharged through the open bottom of the tube. In this way, all the wood chips will fall onto the ground between the bucket elevator scoops 8, 9, where they are collected by the scoops and transferred to the belt conveyor 13 on the undercarriage 1, for further transport away from the pile in a conventional manner which need not be described in detail.

A number of modifications of the apparatus can be made within the scope of the invention. For example, the slots on the scraper tube can have a width, measured along the longitudinal axis of the tube, of between 10 and 50 cm, and a span transverse to the longitudinal axis corresponding to 0.4 to 0.8 times the circumference of the tube. The dimensions of the preferred embodiment, however, are preferred for a wood chip pile.

For optimum scraping effect, the slots have a lower edge that projects outwardly from the wall of the tube further than the corresponding upper edge by about 10 cm. The slots can also be so modified that the distances between the edges of the slots may be between 3 cm and 20 cm.

The oscillatory movements of the scraper tube of the illustrated embodiment need not be effected by a rotatable, motor-driven crank. Other means may be provided for this purpose, such as a rotatable eccentric gear or cam arrangement, or a hydraulic or pneumatic piston-cylinder device connected directly to the scraper tube.

Neither need the device for guiding the oscillatory movement of the scraper tube comprise a sleeve and shaft, as in the illustrated embodiment. Other conventional guide means can be used for this purpose.

While the illustrated apparatus is designed for use with wood chip piles, the apparatus of the invention can be used for removing any particulate material not normally larger than about 0.5 $dm^3$ in volume such as wood chips, bark, coal, ore, slag, municipal waste or industrial waste, from a pile whose sides are at an angle of at least 40° to the horizontal.

Having regard to the foregoing disclosure, the following is claimed as the inventive and patentable embodiments thereof:

1. Apparatus for removing particulate material having a volume not exceeding about 0.5 $dm^3$ from a pile thereof, comprising, in combination,
   (1) an elongated tubular scraper means arranged for oscillatory movement along its longitudinal axis;
   (2) a base upon which the scraper means is carried in a manner to be brought into contact with a side of the pile of material from the bottom up to the top of the pile;
   (3) the tubular scraper means being open at the bottom thereof, and having a side wall which can be brought into contact with a side of the pile, and which has a plurality of slots therethrough arranged one above the other and extending along the longitudinal axis of said tube, the lower edge of at least one such slot projecting outwardly from the outer wall of the tube further than the upper edge of such slot; and
   (4) the tubular scraper means when oscillating scraping material from the pile through the slots into and through the tube down to the ground, so that said material can be collected and carried away from said pile.

2. Apparatus according to claim 1, in which the slots have a height within the range from about 10 to about 50 cm.

3. Apparatus according to claim 1, in which the slots have a span within the range from about 0.4 to about 0.8 circumference of the tubular scraper means.

4. Apparatus according to claim 1, in which the lower edge of each slot extends from about 3 to about 20 cm further from the tube than the upper edge of the slot.

5. Apparatus according to claim 1 having coupled to the scraper means a drive assembly comprising a rotatable, motor-driven crank.

6. Apparatus according to claim 5, in which the drive assembly comprises a piston and cylinder.

7. Apparatus according to claim 1, in which the oscillatory movement of the scraper means is controlled by sleeves connected to the base and extending parallel to the scraper means, and by shafts which are connected to the scraper means and which are reciprocatingly movable in said sleeves.

8. Apparatus according to claim 7, in which the sleeves are rotatably connected to the base so that said sleeves and said scraper means can be rotated about axes extending parallel with the base of the pile.

9. Apparatus according to claim 8 having an extendible and retractable jib mounted on the base, and one of the sleeves is pivotably mounted on the free end of the jib.

* * * * *